United States Patent

[11] 3,532,120

[72] Inventors Robert Barclay Beahm, Brighton;
William B. Brosius, Jr., Perinton; Bruce
D. Gibson, Greece; George Robert Leavitt;
Brighton, New York
[21] Appl. No. 677,451
[22] Filed Oct. 23, 1967
[45] Patented Oct. 6, 1970
[73] Assignee Sybron Corporation,
a corporation of New York

[54] DIVERSION VALVE AND SYSTEM
17 Claims, 6 Drawing Figs.
[52] U.S. Cl.................................... 137/609,
137/612.1
[51] Int. Cl..................................... F17d 1/00,
F17d 3/00
[50] Field of Search............................ 137/608,
609, 612.1, 312

[56] References Cited
UNITED STATES PATENTS
228,051  5/1880  Fowler ..................... 137/608
1,624,572  4/1927  Bagby....................... 137/609X
2,484,622  10/1949  Hartman................... 137/312
3,052,444  9/1962  Kintner .................... 137/612.1X
3,054,423  9/1962  Houle....................... 137/609
3,084,674  4/1963  Watson .................... 137/609X FOREIGN PATENTS
1,174,725  11/1958  France ..................... 137/608

Primary Examiner—James Kee Chi
Attorneys—Peter J. Young, Jr. and Joseph C. Mac Kenzie ABSTRACT: A diversion valve consists essentially of a pair of three-way valves which are connected together at right angles to each other. Liquid entering the end of one valve and exiting out the other would move in a flow path at right angles to a corresponding flow in the other. However, a common duct interconnects portions of such flow paths. The one valve is arranged with its flow path horizontal, and liquid is supplied intermediate its liquid flow path, which liquid either goes out one end or the other of the valve. One such end is connected by the common duct to the intermediate portion of the other valve's flow path, which is vertically oriented. Hence, liquid comes out one end of the latter valve or the other. The common duct slopes down from the horizontal valve to the vertical valve. The stem of the one valve extends horizontally through a stuffing box which is mainly an O-ring sealed cylindrical passage through the metal body of the valve. The outer end of the stuffing box supports a snugly fitting fluid-pervious Teflon guide for the stem, and the stem is hard chrome plated where it contacts the stuffing box which prevents galling, and provides wear-resistance.

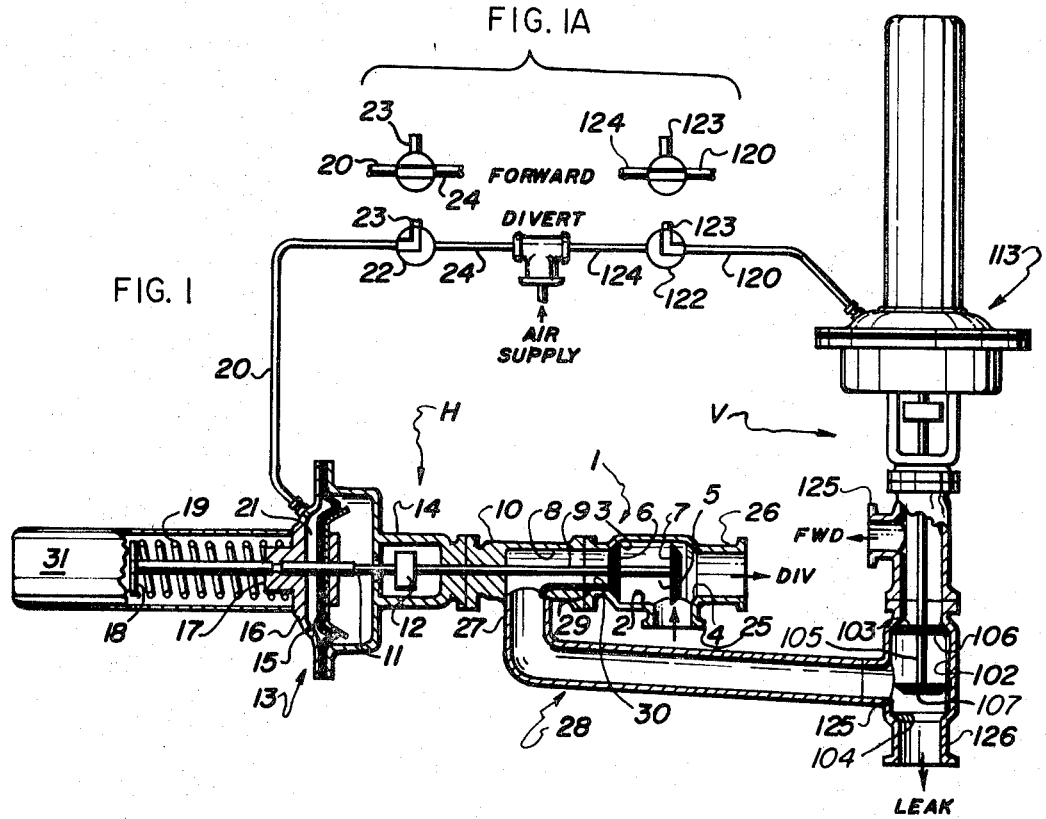
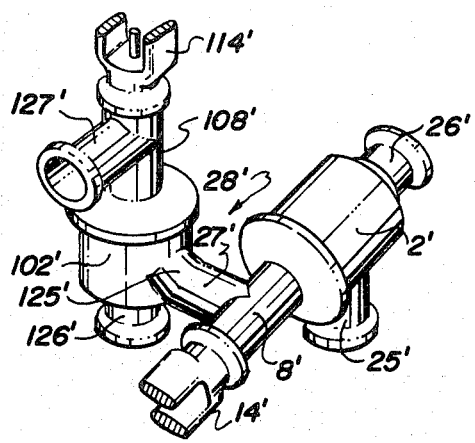

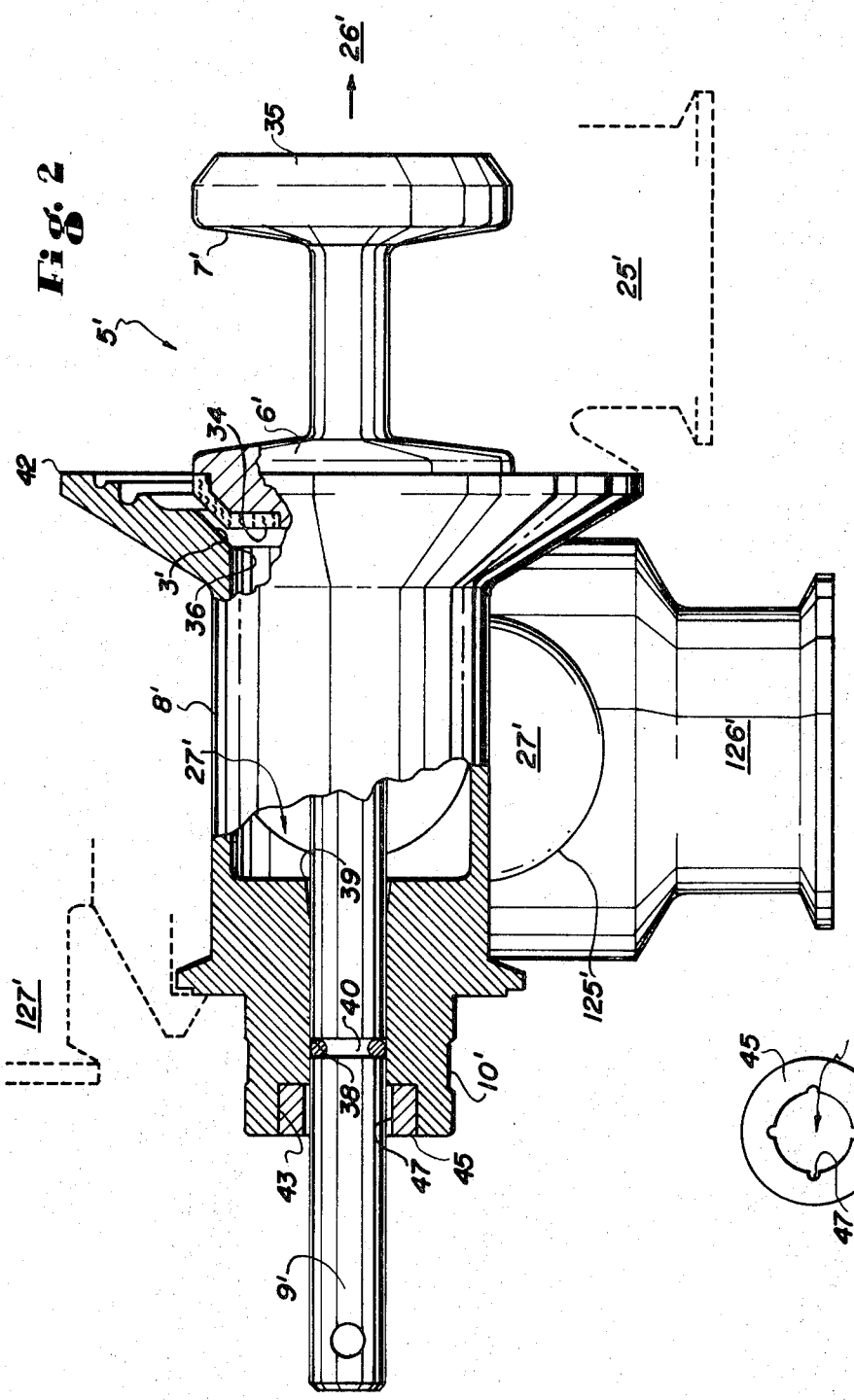

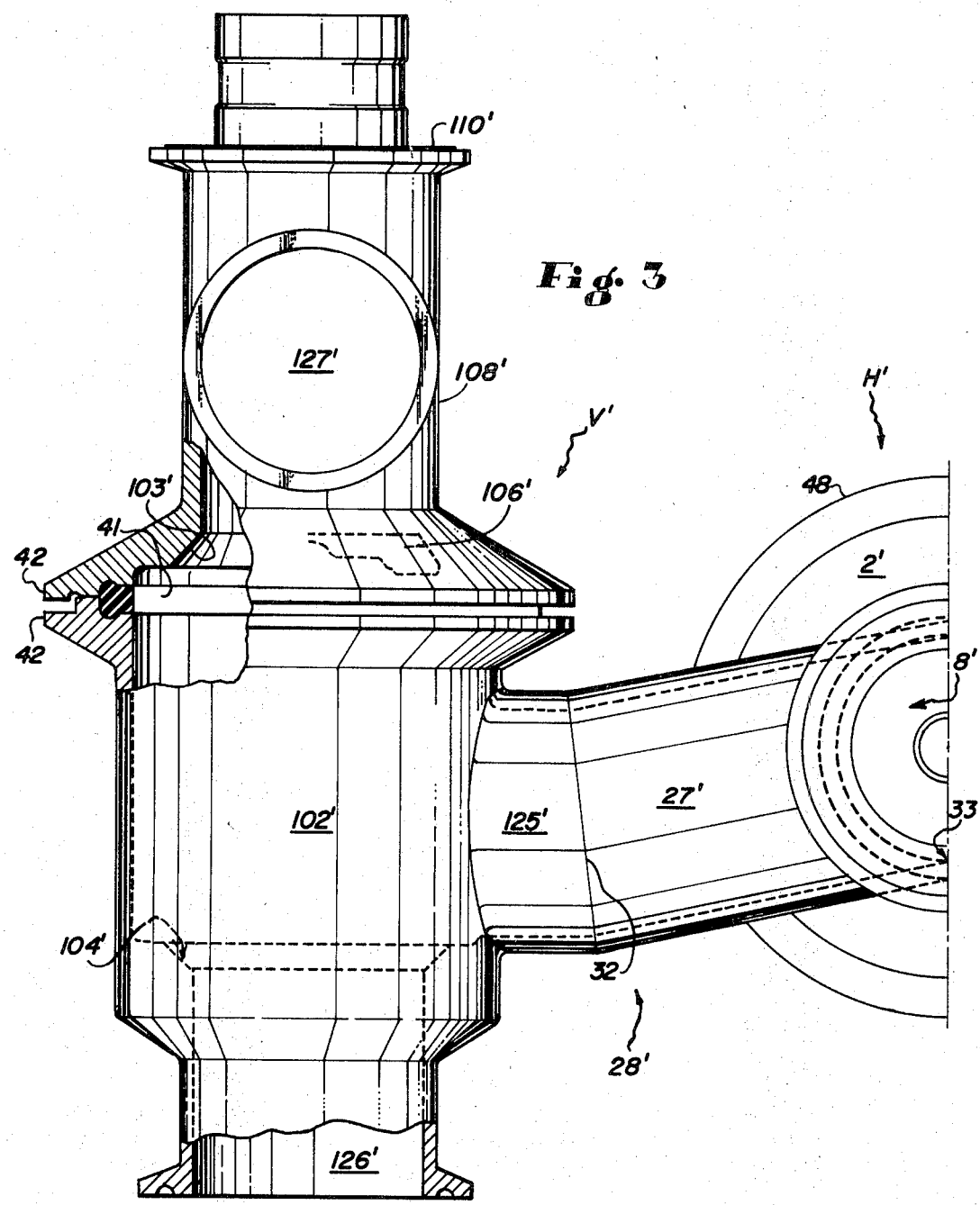

DIVERSION VALVE AND SYSTEM

In flow diversion valve systems, multi-way valving allows transferring liquid from one place to another and, on occasion, diverting it to still another place. Where health considerations are involved, as in pasteurizing milk, sanitary regulations promulgated by public health authorities impose various considerations on the design of the system, such as leak detection and protection, self-drainability and cleanability.

The first consideration leads to valve designs wherein it is sought to make leakage visible from the exterior of the system, and to isolate leaked liquid from the system. The second consideration is obviously related to the first, and involves so constructing the parts of the valving touched by the milk, and so orienting the valving, that if milk is not supplied to the valve, milk previously supplied to the valve drains out of it under the force of gravity. The third consideration ranges from making the valving easily disassemblable for cleaning, to making its parts cleanable in place, i.e., without dissasembly, by what amounts to circulating cleaning and sanitizing agents in the system, instead of milk.

The patents to Newhall, Karst and Hartman, U.S. Pat. Nos. 2,118,858, 2,243,344 and 2,484,622, respectively, represent past approaches to providing sanitary type valving for pasteurizing systems. The considerations referred to above are reflected in the valve design of these patents. Thus, interiors of these valves are provided with smooth surfaces oriented for drainage to low points; and threads, crevices and other possible collectors of liquid are shunned. The present invention also relies on such expedients, but in contrast to the patent devices, provides substantially total drainability, leak detection and protection, and is truly cleanable in place. In substance, the invention amounts to providing a pair of valves, like those of the patents (but omitting mechanical leak detector elements), orienting the valves at right angles to one another, and interconnecting the valves such that drainage from both valves flows to the same outlet, which is part of one of the valves.

In the drawings:

FIG. 1 is a partly schematic, partly cross-sectional showing of a diversion valve system according to the invention;

FIG. 1A is a fragment illustrating an operational condition of the system of FIG. 1;

FIGS. 2 and 3 are elevations, partly in section, of a specific construction of valving according to the invention;

FIG. 4 is a plan view of a detail of FIG. 2; and

FIG. 5 is a perspective view of the diversion valve according to the invention.

In FIG. 1, a flow diversion valve according to the invention essentially consists of a pair of like three-way valves H and V. Each valve is made of suitable material, such as stainless steel, and its interior parts are smooth-surfaced, crevice-free, thread-free, and their surfaces are so sloped and contoured that, in the illustrated orientation, liquid in the valve drains by gravity, to some place where it can exit from the valve under the force of gravity. Each of valves H and V are in essence designed in accordance with prior art teachings in these respects. However, it is to be noted that the valve according to the invention neither has nor needs distinct leak detector elements of the sort described in connection with FIG. 3 of the Hartman patent.

Looking at valve H in detail (no separate description will be made of valve V, since its parts are the same), valve H includes a fluid conduit 1, having a valve chamber 2, the interior of which latter is provided with a pair of beveled surfaces providing seats 3 and 4, between which valve plug 5, having correspondingly-beveled discs 6 and 7 moves. Conduit 1 includes a portion 8, through which a valve stem 9 passes, extending into chamber 2 and having discs 6 and 7 fixed thereto. The parts thus far referred to have circular contours, which are coaxial with the line of motion of stem 9, the section portrayed in FIG. 1 being on the diameters of the part contours. The stem 9 passes through a stuffing box portion 10 of the portion 8, and has an extension 11 fixed thereto by a coupler 12 which permits a motor 13 of valve H to be removed therefrom. The motor 13 is mounted by a rigid bracket 14 on the gland portion 10 of the valve and includes a flexible diaphragm 15, fixed to the extension 11 and closing off an air dome 16 fixed to bracket 14. Dome 16 has a gland portion 17, through which extension 11 passes, and, by means of a plate 18 fixed to the end of the extension 11, is forced toward the left (in the drawing) by a spring 19 compressed between said plate and said dome. An air line 20 is connected at one end to the closed chamber 21 defined by dome 16 and diaphragm 15, and its other to a valve 22. For purposes of explanation, valve 22 is to be deemed a three-way valve, which as shown, opens the interior of chamber 21 to the atmosphere via a vent 23 and air line 20.

Valve 22 can also be made to connect the air line 20 to an intake 24 of the valve 22 which is connected to a source of air (designated AIR SUPPLY) under pressure greater than atmosphere, this condition of valve 22 being illustrated in FIG. 1A.

It will be evident that in FIG. 1, the spring 19 forces stem 9 to the left, thereby seating disc 6 in seat 3, and sealing the interior of portion 8 from the interior of portion 2. On the other hand, with valve 22 in the condition shown in FIG. 1A, the air pressure from the air supply enters chamber 21 and forces diaphragm 15 and, hence, stem 9, also, to the right, thereby unseating disc 6 from seat 3 and seating disc 7 in seat 4, thus allowing the interiors of portions 8 and 2 to communicate freely.

The valve H has an inlet 25 opening through the side of portion 2 into the interior thereof between seats 3 and 4. An outlet 26, essentially a rightward extension of portion 2, provides for flow between whatever is connected to the right end of outlet 26 and the interior of extension 2, and past seat 4, whenever the disc 7 is unseated as shown in FIG. 1. An outlet 27 performs the same function with respect to flow via seat 3 between the interiors of portions 2 and 8. According to the invention, the interior outlet 27 connects to the lowest point in the interior of portion 8, and from there extends downwardly as the common conduit 28, of which the lowest interior points monotonically slope downwardly away from the juncture between it and outlet 27. Conduit 28 is termed "common" since it is required for proper cooperation of valves V and H and is essentially part of each. (It is to be remarked that, unlike the remainder of FIG. 1, the proportions and shape of common conduit 28 and outlet 27 are exaggerated for clarity.)

In the horizontal, the heavy line 29 is intended to represent the locus of the lowest points in the interiors of portion between seat 3 and outlet 27. In this position, any liquid in the corresponding area drains into the outlet 27. The line 29 also emphasizes the locus of the lowest points of seat 3. Where the two loci meet, at point 30, the disc 6 and seat 3 will be so constructed that all points around the seat 3, corresponding to point 30, will be seated so as to leave no crevice. Preferably, in situ in diversion valve service, valve H is tilted slightly so that line 29 as the whole slopes downward to the left.

Gland portion 10 is not self-draining, strictly speaking, but stem clearance therein will be sufficiently small as to be tolerated by sanitary regulations. It will be evident then that all significant quantities of liquid can drain by gravity out of the interior of portion 8 and the interior of portion 2 to the left of seat 4, into the drainage chamber provided by conduit 28.

The showing of valve V is in all respects similar to valve H, save for its orientation (and for such motor details as were revealed by the breaking away of a cover or casing member 31 of valve H). For purposes of explanation, each reference numeral used for a valve V part like a valve H part is the reference numeral of the latter part, but with 100 added thereto. Thus, in valve V, reference numeral 125 identifies an inlet which structurally corresponds to inlet 25, each being but a short piece of cylindrical pipe, the one connected to the interior of portion 2, valve H, and the other being similarly connected to portion 102, valve V, portion 102 corresponding to portion 2, valve H. Reference numeral 127 of valve V is an outlet corresponding to outlet 27, and like its counterpart 26, the element denoted by reference numeral 126, is also an outlet. It will be recognized that the inlet-outlet terminology has to do with the coaction of the various flow passages in flow diversion service, rather than structural difference.

In flow diverting position, the valves 22 and 122 allow the discs 6 and 106 to be seated in their respective seats 3 and 103. At this time, milk which has not been properly pasteurized is flowing into inlet 25 and out of outlet 26, say, to a reservoir, the contents of which will eventually be subjected to the pasteurization process again. In the meantime, the pasteurizing apparatus will be adjusted, by suitable control apparatus (not shown), to make it produce properly pasteurized milk.

When such adjustment is accomplished, properly pasteurized milk will be entering the interior of chamber 2, and flushing from every surface therein all traces of improperly pasteurized milk out through outlet 26.

It will be noted that as long as no leakage is to be observed coming from outlet 126 (while the valve H is diverting), valves 22 and 122 may be operated to the FIG. 1A condition with confidence that no improperly pasteurized milk has contacted valve parts between seats 3 and 103. Normally, diversion is caused to occur when the milk at a point upstream from inlet 25 reaches a temperature below the "legal" value. that is, the value to which all "forward" flow milk must have been subjected. Accordingly, below-level temperature milk does not actually enter inlet 25 until disc 6 is seated in seat 3. On the other hand, disc 6 is not caused to move off seat 3 until legal-temperature milk has entered the valve and flushed chamber 2 out through outlet 26. On the other hand, since valves V and H can be operated independently of one another, it is also possible to flush or clean parts of the system in isolation from another. For instance, valve V could be held in forward flow preventing condition shown, while valve H is held in the diversion flow preventing condition and flushed or cleaned by flow entering via inlet 25. In passing, it is to be remarked that liquid is ordinarily introduced into the valves by pumps.

In any event, after forward flow has been restored, milk enters inlet 25 and exists via outlet 27, enters portion 102 via inlet 125 and exits via outlet 127 to suitable apparatus connected thereto, designed to receive or further process properly pasteurized milk. Should improper pasteurization occur again, valve 122 will be set to its FIG. 1 state to stop flow of milk through valve V to the last-mentioned apparatus, and valve 22 will be put in its FIG. 1 state to divert improperly pasteurized milk to such apparatus as is connected to the outlet 26.

The flow diversion valve arrangement of FIG. 1 is not only self-draining, but unlike its prior art predecessors, peculiarly suited to cleaning in place, that is, without removing it from the system in which it is connected, and without disassembly. In these respects, flow diversion valves must conform to various legal requirements to insure freedom of contamination of pasteurized product and maintenance of sanitary conditions in the parts of the valves contacted by such product. One of the standards is isolation of pasteurized product from unpasteurized product. In FIG. 1, this is insured by the self-draining internal volume of valve between discs 6 and 106. Another requirement is leak detection, often provided by so-called leak detectors, as disclosed in the cited Karst and Hartman patents, but provided, in the present invention by the aforesaid internal volume of valve. Thus, in FIG. 1, leakage past disc 6 drains out freely via outlet 126.

Again, to be cleanable in place, the interior of the valve must be reachable at all points by cleaning liquid. Leak detection as provided by the leak detector elements of Karst and Hartman makes their diversion valves inferior to the present invention in this respect, since it is really necessary to disassemble these prior diversion valves in order to be able to properly clean the diversion valves.

Preferably, valves V and H are more integrated structurally than shown in FIG. 1, as shown in FIGS. 2, 3 and 5, for example. In essence, in these latter FIGS. the common conduit 28' has been reduced to the outlets 27' and 125', (reference numerals of FIGS. 2, 3 and 5 indicate the same structure as in FIG. 1, but are primed for purposes of distinction therefrom). Outlets 27' and 125' are short pieces of cylindrical pipe welded together as at line 32. As the inclination of line 32 indicates, the ends of the pipe would be more oval rather than circular, hence, care should be taken that lack of congruence between the ends does not leave a step or crevice at the weld. The cylinder axes of these outlets also are tilted with respect to the horizontal in which the axis of valve H' is placed (the axis of valve V' being placed in the vertical, of course). The tilt is somewhat exaggerated, and preferably it and the dimensions of the valves are such that the level of the top face of disc 106' (as shown in dashed line, FIG. 3) should be above the highest point inside portion 2' of valve H'.

It will be noted, too, that outlet 27' drains away on a slant from the lowest part of portion 8' (indicated at 33, FIG. 3) rather than more or less directly down from the portion, as FIG. 1 portrays it doing.

As will be seen from FIG. 2, the discs 6' and 7' are parts of a one-piece plug 5' the contours of which are such as to be self-draining. Annular gaskets, like that shown at 34 and 35, and made of a suitable sealing material, such as rubber, etc., are bonded, as by vulcanizing to the beveled portions of the discs. The interiors of the valves are generally rounded, except that the lesser-diameter regions of the seats may merge with inner valve surfaces, as shown in the case of seat 3', and the portion 8', along a sharp line, as portrayed at 36.

Stem 9' passes through a passage 39 in stuffing box 10' to, say, a mechanical coupling (not shown). The liquid seal around the stem is furnished solely by an 0-ring 38 located in the circumferential groove 40 of stem 9'. The clearance between the stem 9' and the passage 39 is rather slight, thereby providing a relatively inaccessible crevice about the valve stem. However, under the usual sanitary regulations, this is not considered to detract from the self-draining and cleanability properties of a valve.

In order to prevent galling or serious wear of the bearing surfaces of stem 9' and passage 39, the bearing surface of stem 9' is hard-chrome plated, 0-ring 38 merely providing a liquid seal, and guiding support for the stem being provided by a guide 45 (and, in the case of valve H, the side of passage 39). The guide 45, which is the form of a ring, has a passage 46 therethrough which snugly fits stem 9'and is preferably made of a strong, durable plastic, such as Teflon, having antifriction properties. Guide 45 is recessed fixedly in place in stuffing box portion 10', and in order to provide leak detection (should 0-ring 38 fail) has channels 47 arranged around the inner periphery of the guide 45. Liquid leaking past 0-ring 38 will flow through channels 47 to the exterior of the valve where it will be seen. (The structure which attaches the valve motor (not shown) to the stuffing box portion 10' is ordinarily open, exposing the emerging stem 9' to view from the exterior.

Lesser variations of the orientation of valves V and H, and V' and H'would involve interchanging divert and leak detection outlets. Thus, the common conduit 28 (or inlets 125 and 125') could be extended up to outlets 26 and 26' instead of to outlet 27 or 27'. Since the divert outlet would now be outlet 27, FIG. 1A would show the divert setting of valve 22, unless the motor 13 were replaced by a reverse acting motor. This variant may be further varied by inverting valve V and sloping conduit 28 (or inlets 125 and 125') up to outlet 26 or 26'. This would make outlet 126 or 126' the forward outlet and outlet 127 or 127' the leak detector outlet. In this second variant, either both motors 13 and 113 would be replaced by reverse-acting motors, or otherwise. FIG. 1A would now show the divert condition of the valves, and FIG. 1 the forward configuration. The versions of valve orientation and connections shown in FIGS. 1, 2 and 3 are to be preferred, (particularly the latter, which is the most compact). It is also preferable to avoid reverse-acting motors, and operating the valve V or V' in the inverted position would permit leakage from the stuffing box section 110 to fall on the motor portions of the valve.

Various forms of means for connecting diversion valves with the piping of a pasteurization system are met with in practice, hence, no particular form of outlet and inlet ends has been specified. In general, it is desirable to seal such connections with gaskets so located and shaped as not to provide milk-catching crevices.

Similar precautions must be taken in the valve assembly. For example, a gasket 41, FIG. 3, proportioned so as to be compressed and to have its inner periphery substantially flush with adjacent interior surfaces of the valve, when the faces of flanges 42 of the portions 8' and 2' are in contact as shown in FIG. 2, provides for sealing as well as cleanability and self-drainability, in acceptable fashion.

In pasteurizing service, the valve parts contacted by milk would be made of stainless steel, satin finished (120 grit, for example) and proof against attack by the cleaning and sterilizing agents customarily used. While dimensions and external form may vary, it is desirable to proportion the interior for free flow. For example, in pasteurization service, internal diameters may be about 2 inches (except for the plug-containing portions which would have about 3-inch inner diameters), with valve stem motion of about three-fourths inch from seat to seat.

In explaining the use and operation of the valve according to the invention manually-controlled pneumatic valve motors have been specified. However, it is obvious that electrical or hydraulic motors could be used, and that provisions for automatic control may be made. For example, in pasteurizing service, ordinarily some means for measuring the temperature of incoming milk is provided which automatically causes the valve to divert if the milk drops below a certain temperature. Those skilled in the art will be aware of how to utilize our invention in a variety of systems, without departing from the scope of the claims appended hereto.

We claim:

1. In a three outlet, one inlet diversion valve having a duct; a first seat in said duct through which one outlet opens into said duct, a second seat through which the second outlet opens into said duct, a first plug in said duct, said first plug being adapted to be moved from seating on one said seat to seating on the other said seat, and vice versa; a third seat through which the third outlet opens into said duct, a fourth seat in said duct, a second plug in said duct, said second plug being adapted to be moved from seating on one of the two last-said seats to the seating on the other thereof, and vice versa; said plugs, seats, outlets, and inlet being constructed and arranged such as to be substantially self-draining while said valve remains in situ in a liquid distribution system; the improvement wherein the spatial orientation of said fourth seat, of one of said first and second seats, and of said duct is such that, when said valve is in situ as aforesaid, said fourth seat drains by gravity through said duct and said duct drains by gravity to said one of said first and second seats, the nether portion of said duct defining a liquid flow path sloping monotonically downward, from said fourth seat to said one of said first and second seats.

2. The invention of claim 1, wherein said improvement includes said third and fourth seats being spatially oriented when said valve is in situ as aforesaid, such that if liquid flowed between said third and fourth seats, such flow would be in a substantially horizontal direction.

3. The invention of claim 2, wherein said second plug is provided with a stem for moving said second plug between said third and fourth seats, said stem being movable along the horizontal, and extending along the horizontal to the region outside of said duct.

4. The invention of claim 2, wherein said first and second seats are spatially oriented, when said valve is in situ as aforesaid, such that if liquid flowed between said first and second seats, such flow would be in substantially vertical direction.

5. The invention of claim 4, wherein said second plug is provided with a stem for moving said second plug between said third and fourth seats, said stem being movable along the horizontal and extending along the horizontal to the region outside said duct; said first plug also being provided with a stem, the last said stem being movable along the vertical and extending along the vertical to the region outside said duct.

6. A liquid treating system including the valve of claim 1, and further including means arranged to cause treated liquid to enter said duct via said inlet, and to exit the valve from one or another of said outlets when a said plug is not seated on the corresponding one of said seats; said one of said first and second outlets being connected to first means for receiving liquid and the other thereof being connected to second means for receiving liquid, and said third outlet being connected to third means for receiving liquid; said valve being in situ, as aforesaid, in said system.

7. A liquid treating system including the valve of claim 2, and further including means arranged to cause treated liquid to enter said duct via said inlet, and to exit the valve from one or another of said outlets when a said plug is not seated on the corresponding one of said seats; said one of said first and second outlets being connected to first means for receiving liquid and the other thereof being connected to second means for receiving liquid, and said third outlet being connected to third means for receiving liquid; said valve being in situ, as aforesaid, in said system.

8. A liquid treating system including the valve of claim 3, and further including means arranged to cause treated liquid to enter said duct via said inlet, and to exit the valve from one or another of said outlets when a said plug is not seated on the corresponding one of said seats; said one of said first and second outlets being connected to first means for receiving liquid and the other thereof being connected to second means for receiving liquid, and said third outlet being connected to third means for receiving liquid; said valve being in situ, as aforesaid, in said system.

9. A liquid treating system including the valve of claim 4, and further including means arranged to cause treated liquid to enter said duct via said inlet, and to exit the valve from one or another of said outlets when a said plug is not seated on the corresponding one of said seats; said one of said first and second outlets being connected to first means for receiving liquid and the other thereof being connected to second means for receiving liquid, and said third outlet being connected to third means for receiving liquid, said valve being in situ, as aforesaid, in said system.

10. A liquid treating system including the valve of claim 5, and further including means arranged to cause treated liquid to enter said duct via said inlet, and to exit the valve from one or another of said outlets when a said plug is not seated on the corresponding one of said seats; said one of said first and second outlets being connected to first means for receiving liquid and the other thereof being connected to second means for receiving liquid, and said third outlet being connected to third means for receiving liquid; said valve being in situ, as aforesaid, in said system.

11. A diversion valve having a drainage chamber, a horizontal flow passage and a vertical flow passage, said chamber connecting to one end of said horizontal flow passage and to an intermediate portion of said vertical flow passage; the lower end of said vertical flow passage terminating in an outlet, and the side of an intermediate portion of said horizontal flow passage having an intake; a first plug in the first said intermediate portion and a second plug in the second said intermediate portion; said first plug being operable to allow flow from said first said intermediate portion to said lower end of said vertical flow passage and to prevent flow therefrom to the other end of said vertical flow passage, and vice versa; said second plug being operable to allow flow from said second said intermediate portion to said one end of said horizontal flow passage and to prevent flow therefrom to the other end of said horizontal flow passage, and vice versa; said first said intermediate portion being located at a lower level than said second said intermediate portion, and said chamber sloping monotonically upward from its connection to said first said intermediate portion, to its connection to the said one end of said horizontal flow passage.

12. In the invention of claim 11, a stuffing box at one end of the said horizontal flow passage, and a stem extending through said stuffing box into the said second intermediate portion, said second plug being secured to said stem for operation thereby, said stuffing box having a horizontal passage substantially filled by said stem, thereby being means resiliently slidably sealing said stem in the last said passage, the outer end of said last said passage having a fluid-pervious guide snugly and slidably grasping said stem, said stem being hardened and smooth, for sliding thereof on the side of said last said passage.

13. In a valve having a flow passage, a plug received between a pair of seats in an intermediate portion of said flow passage, a stuffing box at one end of the said flow passage, and a stem extending though said stuffing box into the said first intermediate portion, said plug being secured to said stem for operation thereby, said stuffing box having a passage substantially filled by said stem, and there being means resiliently slidably sealing said stem in the last said passage; the improvement wherein the outer end of said last said passage has a fluid-pervious guide snugly and slidably grasping said stem, and said stem is hardened and smooth, for sliding thereof on the side of said last said passage.

14. In a diversion valve having a pair of cylindrical body portions, said portions being spatially oriented so that the axis of one thereof is perpendicular to the other thereof, a common duct connecting said portions, one end of said duct being cylindrical and projecting from one said body portion at right angles to the axis of the latter and the other end of said duct being cylindrical and projecting from the other said body portion at right angles to the axis of the latter, said duct having its length comprising two cylindrical parts of which the respective axes are the axes of its said end portions; each said portion having a plug therein movable to prevent liquid from entering said duct, via the last said portion; each said portion having a pair of seats therein spaced along its said axis, and its said plug being movable from one of its said seats to the other; each said portion also having the corresponding one of said cylindrical parts opening into it between its said seats.

15. The invention of claim 14, wherein the one said cylindrical part terminates in an oval end contour and the other said cylindrical part terminates in an oval end contour, said body portions being oriented with respect to each other such that contours are substantially coincident, there being means securing said contours hermetically together.

16. The invention of claim 14, wherein the said axis of the one said body portion intersects the said axis of the corresponding said end of said duct, and the said axis of the other said body portion intersects the said axis of the corresponding said end of said duct.

17. A liquid flow system including a valve having the said body portions of claim 14, wherein said body portions are arranged such that liquid from said system enters said body portions, said body portions being spatially oriented so that the axis of said one end of said duct is horizontal, so that the axis of the other said body portion is vertical and higher than the said axis of said one end of said duct, and so that one end of a diameter of said one end of said duct is at the same level as the lowest point in said other said body portion.